United States Patent [19]

Waclawsky et al.

[11] Patent Number: 5,197,127
[45] Date of Patent: Mar. 23, 1993

[54] EXPERT SYSTEM METHOD FOR PERFORMING WINDOW PROTOCOL-BASED DATA FLOW ANALYSIS WITHIN A DATA COMMUNICATION NETWORK

[75] Inventors: John G. Waclawsky, Frederick; Raymond F. Daugherty, Mt. Airy, both of Md.; Robert H. Springsteen, Reston, Va.

[73] Assignee: International Business Machines Corporation, Armonk, N.Y.

[21] Appl. No.: 586,828

[22] Filed: Sep. 24, 1990

[51] Int. Cl.⁵ .............................................. G06F 13/00
[52] U.S. Cl. ..................................... 395/200; 370/60; 370/94.1
[58] Field of Search .................. 364/DIG. 1, DIG. 2; 395/200; 370/94.1, 60

[56] References Cited

U.S. PATENT DOCUMENTS

| | | |
|---|---|---|
| 4,750,175 | 6/1988 | Brenneman et al. . |
| 4,821,267 | 4/1989 | Druegh et al. . |
| 4,841,437 | 6/1989 | Lubarsky et al. . |
| 5,093,827 | 3/1992 | Franklin et al. .................. 370/60.1 |

Primary Examiner—Robert L. Richardson
Attorney, Agent, or Firm—John E. Hoel

[57] ABSTRACT

An expert system method is disclosed for analyzing window protocol-based data flows in a data communications network. The method includes the use of a data flow efficiency state variable S which is a binary number having at least three bits which reflect the number of packets transmitted by a node, the queuing of packets within a node, and the congestion of the packets within the node or in the node connected to the node of interest. After having assigned a value to the state variable, a knowledge base is accessed containing network problem determination recommendations for optimizing data flow efficiency within the network.

21 Claims, 8 Drawing Sheets

| MAX WINDOW BIT | QUEUE HELD BIT | QUEUE CONGEST BIT | S = DATA FLOW EFFICIENCY STATE |
|---|---|---|---|
| B1 | B2 | B3 | |
| 0 | 0 | 0 | S0: OPTIMAL STATE |
| 1 | 1 | 0 | S6: LOGICAL CONSTRAINT STATE (WINDOW TOO SMALL) |
| 0 | 1 | 1 | S3: PHYSICAL CONSTRAINT STATE (INSUFFICIENT CAPACITY) |
| 0 | 1 | 0 | S2: LOGICAL CONSTRAINT STATE (QUEUE EMPTYING) |

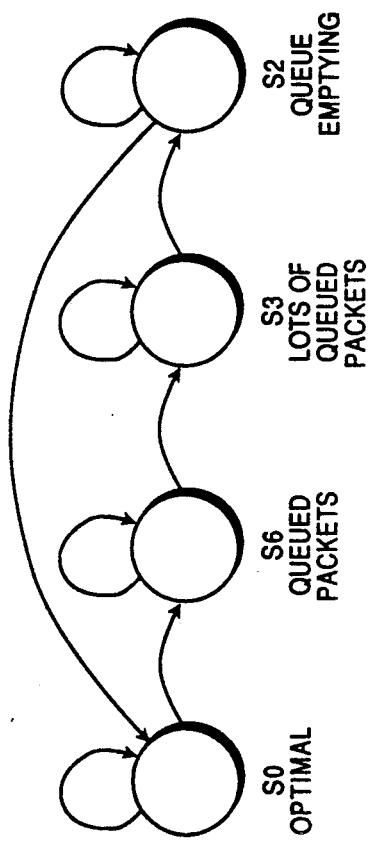
FIG. 9A
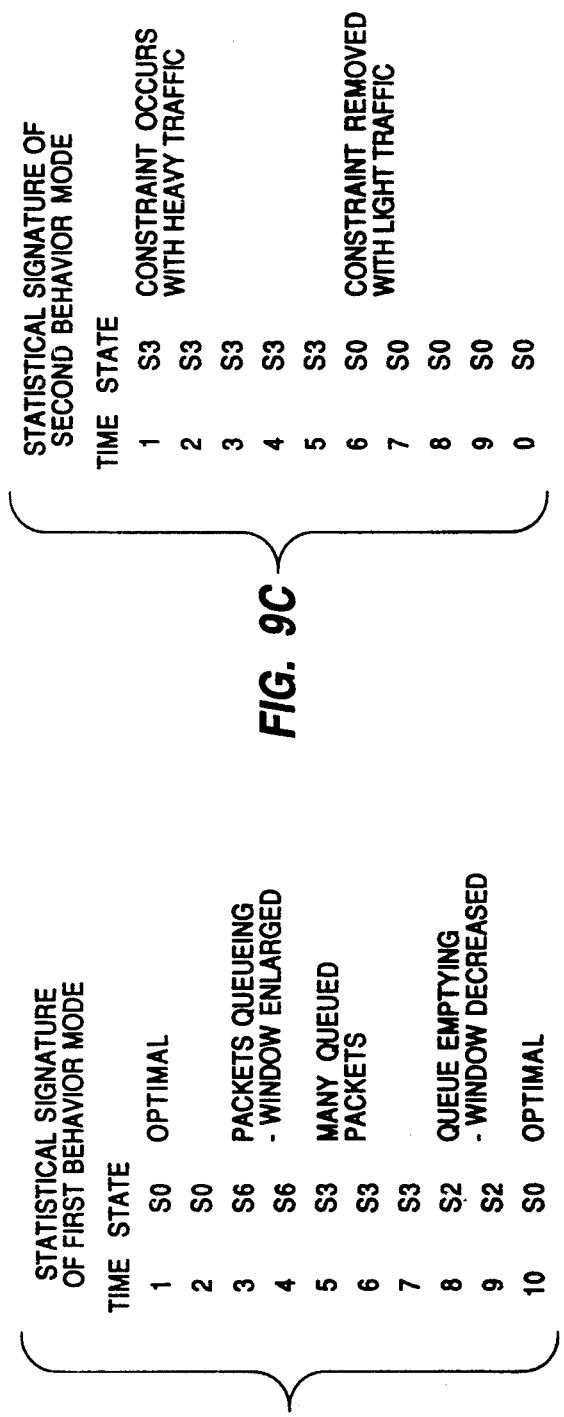
FIG. 9C
FIG. 9B

EXPERT SYSTEM METHOD FOR PERFORMING WINDOW PROTOCOL-BASED DATA FLOW ANALYSIS WITHIN A DATA COMMUNICATION NETWORK

BACKGROUND OF THE INVENTION

1. Technical Field

The invention disclosed broadly relates to data processing systems and methods and more particularly relates to a data processing method for the optimization of data flows in a data communications network.

2. Background Information

Window protocols have been successfully used for multiple purposes in computer networks. Often, they are found at several network architecture layers. They provide a means for flow control and are at the heart of any network congestion control mechanism. Typical window protocols are found in IBM's System Network Architecture which is explained, for example, in the book by Anura Guruge, *SNA—Theory in Practice*, Pergamon Infotech Ltd., 1984. Another window protocol system can be found in DECnet which is described, for example, in the article by Raj K. Jain, "A Timeout Based Congestion Control Scheme for Window Flow Controlled Networks," *IEEE Journal on Selected Areas in Communications*, Vol. SAC-4, No. 7, October 1986. Window protocols allow control of the amount of data in transit between two users of the protocol. As a flow control mechanism they prevent a fast sender from overwhelming a slow receiver. The prior art approach to the analysis of window protocols has been limited to queuing theory or by simulation. Formal queuing theory is used in the analysis of computer network behavior. An example of this is described by Leonard Kleinrock, "Queuing Systems," Vol. 2, *Computer Applications*, New York: Wiley—Interscience, 1976.

Since queuing theory analysis has problems characterizing the dynamic behavior of a network, simulation methods have been applied. Typically, simulations are performed to validate analytic models or investigate the operational details of a specific mechanism. However, considerable effort is involved in building and running any simulator. The use of a benchmark that specifies system topology, hardware behavior and trial workloads requires development. Frequently, shortcuts are taken at the expense of accuracy. Validation of a simulation model and the proper choice of a benchmark to evaluate window protocol behavior appear to be open problems.

OBJECTS OF THE INVENTION

It is therefore an object of the invention to provide a method to improve the data flow in a data communications network, without the drawbacks of queuing theory or simulation techniques in the prior art.

Another object of the invention is to provide an improved method for analyzing window protocol-based data flows in a data communications network so as to obtain problem determination recommendations for the operator with a minimum skill level.

SUMMARY OF THE INVENTION

These and other objects, features and advantages are accomplished by the expert system method for analyzing window protocol-based data flows in a data communications network, disclosed herein. The method includes the steps of setting a packet transmission window to have a maximum quantity of N packets which can be transmitted within an interval from a terminal in the network and setting a queued packet threshold value to a quantity of C packets which may be held in a queue during an interval at the terminal. The method can also be applied to an intermediate node in the network.

The method then defines a data flow efficiency variable S as a binary number having at least three bits, with a first bit B1 which assumes a binary value of one if the number of packets transmitted by the terminal during an interval is equal to N, a second bit B2 which assumes a binary value of one if any packet is held in the queue during an interval and a third bit B3 which assumes a value of one if more than C packets are held in the queue during an interval.

The method then counts the number of packets transmitted from the terminal during a measurement period and sets B1 equal to one if the number of packets transmitted in any interval during the period is equal to N, it sets B2 equal to one if any packet is held in the queue during the measurement period, and it sets B3 equal to one if more than C packets are held in the queue during any interval in the measurement period.

The method then determines the value of the data flow efficiency state variable S from values of B1, B2 and B3 set by the counting and setting steps and it accesses a knowledge base containing network problem determination recommendations which are accessible with the value of the data flow efficiency state variable S.

Finally, the method outputs a problem determination recommendation for optimizing data flow efficiency in the network in response to accessing the knowledge base with the value of S.

BRIEF DESCRIPTION OF THE DRAWINGS

These and other objects, features and advantages of the invention will be more fully appreciated with reference to the accompanying figures.

FIG. 9A is a state diagram example for a network with two examples of how the data flow efficiency state variable changes in FIG. 9B and 9C.

DESCRIPTION OF THE BEST MODE FOR CARRYING OUT THE INVENTION

Figure 1:
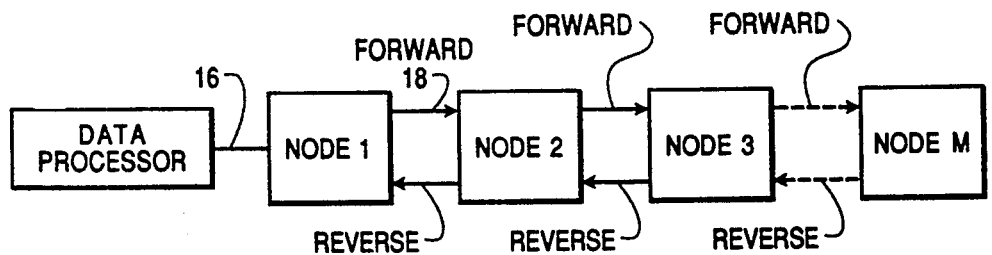
FIG. 1 is an architectural diagram of an example data communication system to be analyzed.

FIG. 1 is an overall block diagram of an example data communications network to be analyzed. The point of analysis will be the node 1 which is an originating terminal. Node 1 has connected to it at 16 a source of data such as a data processor. Node 1 is connected to the network by means of a series of physical links 18 connecting to node 2 which in turn is connected to node 3 which is in turn connected through an arbitrary number of additional nodes to node M. Node 2 is an intermediate node and node N is a destination terminal. A series of nodes, node 1 through node M in the network make up a path. Window protocol controls data flow over this path.

Figure 2:
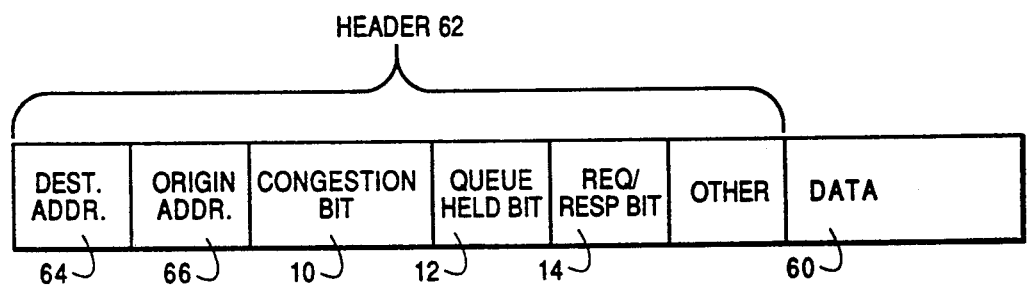
FIG. 2 is an example format of the header portion and data portion of a packet which is transmitted over a communications network.

FIG. 2 shows a data packet which is one of a plurality of data packets which are transmitted over the path from node 1 to node M. A data packet has a data portion 60 and a header portion 62. The header portion can include a destination address 64, an origin address 66, a congestion bit field 10, a queue held bit field 12, and a request/response bit field 14, among others. The operation of the window protocol is controlled by the setting of the congestion bit 10, the queue held bit 12 and the request/response bit 14, among others.

Figure 3:
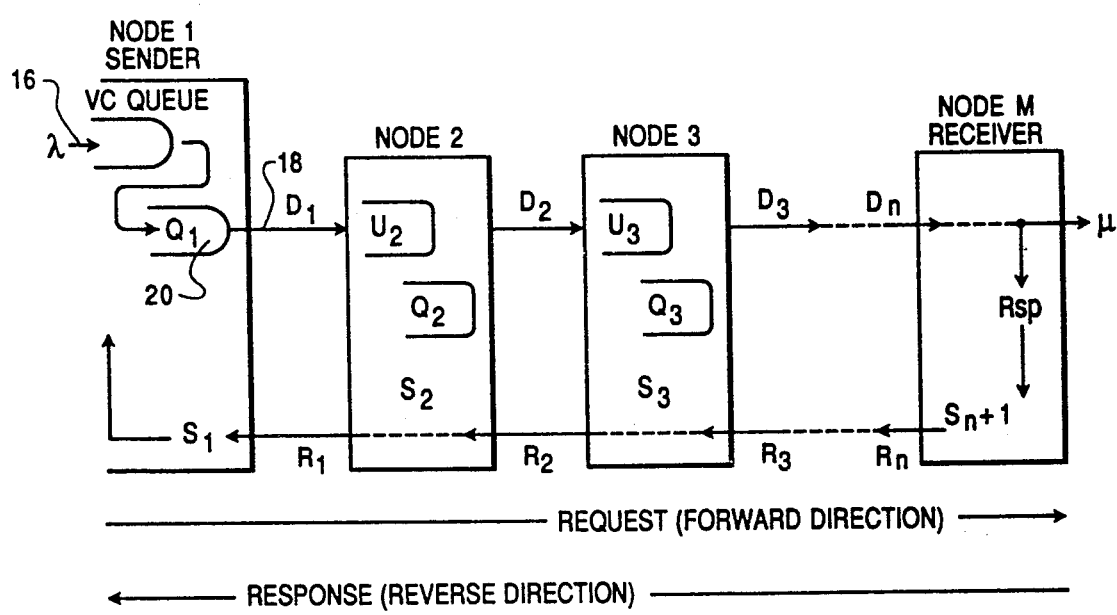
FIG. 3 is a schematic diagram of a simplex virtual circuit path model.

FIG. 3 shows a schematic diagram of a simplex virtual route path model. It can be seen that node 1, node 2, node 3 and node M are represented in FIG. 3. Node 1 can be seen to be made up of two queues 17 and 20 and an input 16 which is the same as the input 16 connected to the data processor in FIG. 1. The node 1 also has an output terminal 18 which is the same as the output connected over the network to node 2 in FIG. 1. The queue 17 in node 1 is a buffer which will hold surplus packets at the node 1 which are unable to be transmitted during a particular interval. The number of packets which may be transmitted during a given interval is limited by a maximum window value which can be set at the initialization of the system.

Figures 4, 8:
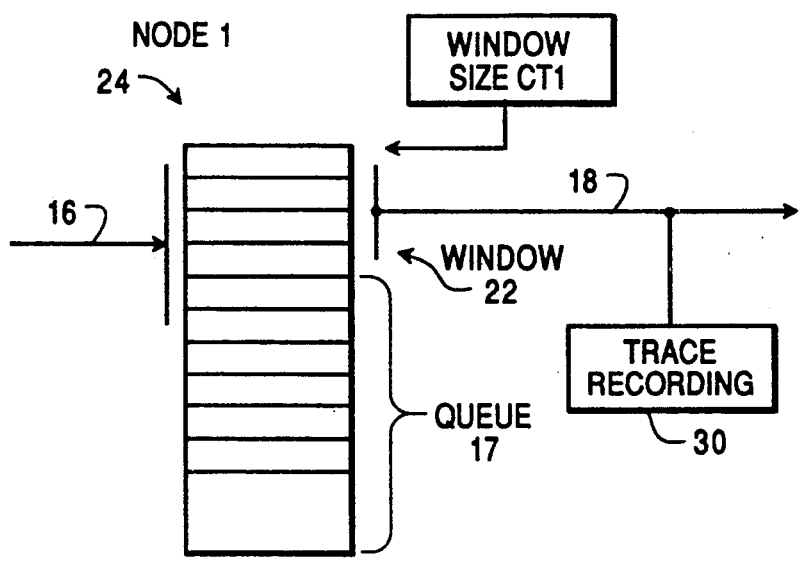
FIG. 4 is a schematic diagram illustrating the window in a node in the data communications network.
FIG. 8 is an illustration of the data flow efficiency state variable S.

FIG. 4 illustrates how establishing the size of the window in the node 1 will govern the accumulation of packets within the queue 17. The window 22 is established at the initialization of node 1. A buffering RAM 24 has an input connected to line 16 from the data processor in FIG. 1. The buffering RAM 24 can accept a relatively large number of packets per transmission interval. The read output from the buffering RAM 24 has its size established by the window 22. Window 22 can be set for example, to six packets per transmission interval. It can be understood that if more than six packets are received by the buffering RAM 24 during a transmission interval, the limitation of the window size of six packets will cause the slow accumulation of the surplus packets in the queue 17 which is a part of the buffering RAM 24.

Figure 5:
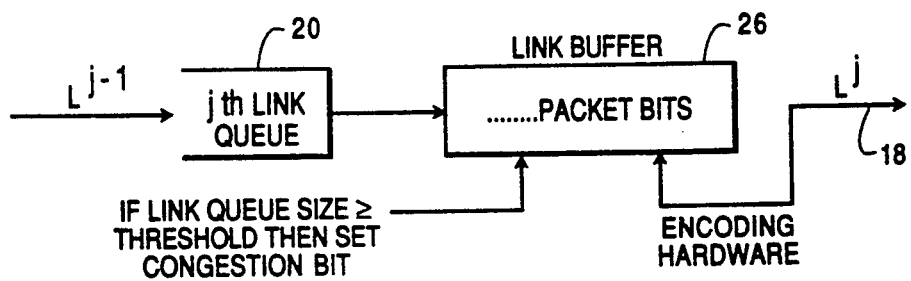
FIG. 5 is a schematic diagram illustrating congestion and detection for a queue in a data communications network.

FIG. 5 is a schematic diagram illustrating congestion detection for the queue 20 in the node 1. At the initialization of node 1, a parameter called the congestion threshold can be established which is a measure of the number of surplus packets which have been accumulated in the queue 20 during a particular transmission interval. If the number of accumulated packets in the queue exceeds the threshold value, then the congestion bit 10 can be set to a binary value of one in the header shown for the packet in FIG. 2. A staging register 26 is shown in FIG. 5 in which the header for the next packet is stored awaiting the next transmission interval. If the link queue size is greater than the threshold during the current transmission interval, then the congestion bit 10 is set in the header stored in the link buffer 26.

Figure 6:
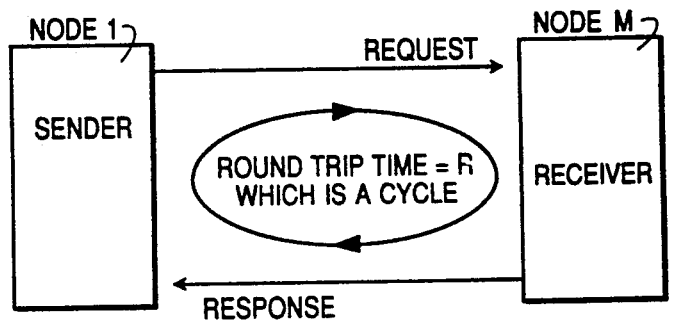
FIG. 6 is a schematic diagram illustrating pacing mechanisms in a window protocol.

FIG. 6 illustrates the pacing mechanism for the window protocol. In some window protocols, the first packet transmitted in a group of packets during a transmission interval includes a request bit which is sent to the destination node M. At the destination node M, the receiver then transmits a response signal back to the sender node 1 which initiates the next transmission interval. The information contained in the header for the first packet being transmitted from node 1 to node M is fed back as a response from node M back to node 1 indicating whether the packet has been held in the queue 17 of node 1 and whether the congestion threshold has been exceeded. In a pacing mechanism in a window protocol, the current size of the window for transmission of packets from node 1 to node M can be increased up to the maximum size set at initialization, in response to the response from the node M indicating that a packet had been held in the preceding transmission interval. The current window size can be increased only up to the maximum window size set at initialization time.

Figure 7:
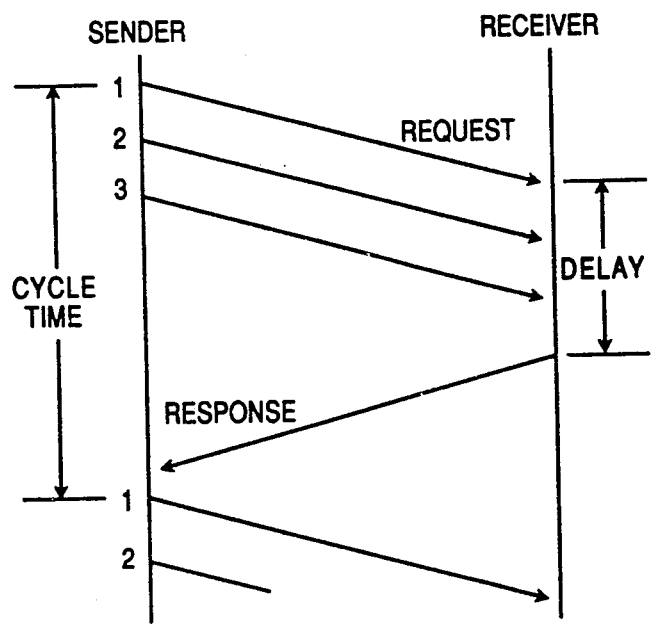
FIG. 7 is an example of window protocol operations.

FIG. 7 is a diagram illustrating pacing with a window size of three packets. If the response is delayed, the cycle time is increased from a minimum value to a duration related to the time that the receiver withholds a response signal. In this manner, the receiver can control the sender.

FIG. 8 illustrates the data flow efficiency state variable S, which variable consists of at least three binary bits. A first bit B1 assumes a binary value of one if the number of packets transmitted by node 1 during an interval is equal to the maximum window size N. A second bit B2 assumes a binary value of one if any packet is held in the queue 17 during a transmission interval. A third binary bit B3 assumes the value of one if more than the congestion threshold C of packets are held in the queue 20 during a transmission interval. Some examples of values for the state variable S are as follows.

S0 has a binary value of zero where B1 equals zero, B2 equals zero and B3 equals zero. This is an optimal state where the node 1 has fewer than the maximum number of packets transmitted during a transmission interval. B2 equaling zero indicates that no packets have been held in the queue 17 during the transmission interval. B3 equaling zero indicates that there are not a sufficient number of packets in the queue 20 to be more than the congestion threshold.

The value of a state variable S6 has B1 equals 1, B2 equals 1, and B3 equals 0. This is a logically constrained state when the window 22 in the node 1 is too small and packets accumulated in the queue 17.

Another example value of the state variable is S3 equals three. This corresponds to B1 equals zero, B2 equals one and B3 equals one. In this physically constrained state, the insufficient physical capacity available on the communications link for the traffic is causing the congestion bit to be set.

Still another example of the state variable is S2 equals two. This corresponds to B1 equals zero, B2 equals one, and B3 equals zero. This is a logically constrained state wherein the queue 20 is emptying after the window 22 has been enlarged in response to a window flow control step.

FIG. 9 is a schematic diagram for a data communications network wherein states S0, S6, S3 and S2 can occur. In FIG. 9 an example state transition diagram is shown between the states S0, S6, S3 and S2. The transition between various states shown in FIG. 9 is a function of the operation of the window protocol as various load levels for packets are input to the data communications system. A first statistical signature illustrating a first example behavior for node 1, FIG. 9B shows a series of 10 consecutive time intervals and the corresponding state values for the state variables. It can be seen that initially the operation at node 1 is optimal with S0 during time intervals 1 and 2. Starting with time interval 3, the packets become queued in queue 17 in node 1 and so in intervals 3 and 4 the state at node 1 is at six. Through the operation of window flow control, information about the condition in node 1 is sent back from node M thereby enlarging the size of the window 22 at node 1. In intervals 5 and 6, as still more packets become queued during each transmission interval S3 becomes the prevailing state. In response to this, more packets can be transmitted over the network for each transmission interval and this will slowly reduce the number of packets in the queue 17, as long as the load of incoming packets on line 16 to node 1 does not increase. This is reflected in intervals 8 and 9 wherein the state is state S2 showing that the queue is emptying. By the time interval 10 arrives, the queues 17 and 20 have emptied sufficiently so that operation at node 1 becomes optimal and the state is now once again at zero.

In FIG. 9C, another operational mode is shown for node 1. In this second statistical signature or second behavior, time interval 1 begins with a state variable of S3 which indicates that there are lots of queue packets in the queue 20 because node 1 is working with a heavy load of packets. If the incoming load on line 16 drops off during one of the early time intervals in FIG. 9C, the quantity of packets in the queue 20 will slowly decrease so that by the time that interval 6 occurs under the right load conditions, the state S0 obtains an optimal operation that node 1 occurs.

Comparing the statistical signature in 9B with the statistical signature in 9C, it can be seen that the behavior of node 1 under the circumstance of a heavy load as compared with a large load in FIG. 9C indicates that there is a problem behavior with node 1. The window protocol is not running efficiently as indicated in FIG. 9C because of the congestion.

Figure 10:
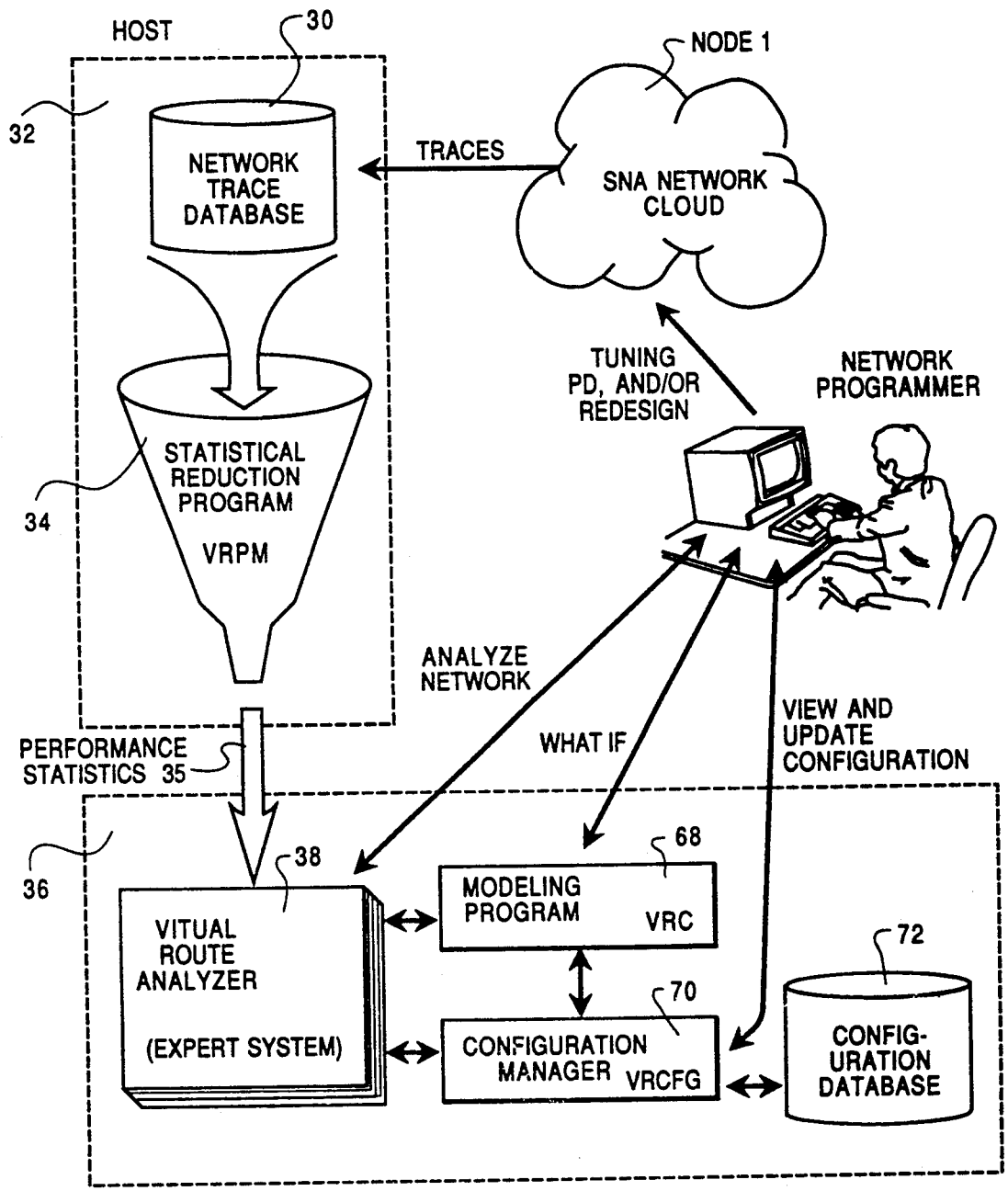
FIG. 10 is a system block diagram of the performance analysis system, in accordance with the invention.
Figure 11:
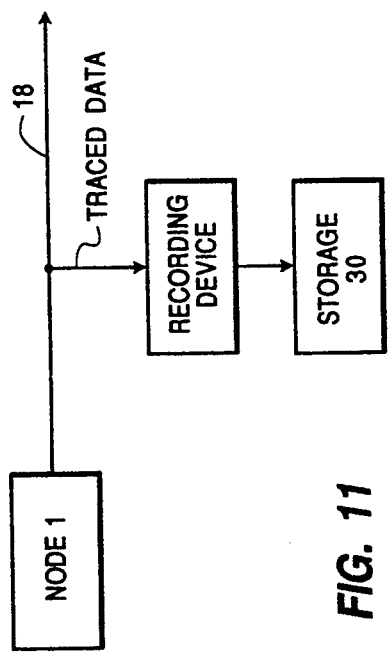
FIG. 11 is a schematic diagram illustrating how trace data is acquired for a terminal in the network under analysis.

FIG. 10 is a system block diagram of the performance analysis system in accordance with the invention. Trace data can be recorded for one or more nodes in the data communications system of FIG. 1 and can be analyzed in accordance with the invention. In FIG. 11, there is shown a typical trace data recording configuration wherein the node 1 can have connected to its output line 18 a trace data recorder which captures all of the communications activity on the transmission line 18. The trace data in storage 30 can then be input to the host 32 in FIG. 10 and subjected to a statistical reduction program 34. The output performance statistics 35 from the statistical reduction program 34 can then be input to the expert system 36. Table 1 shows the performance statistics 35 which are output from the statistical reduction program 34 and which are supplied to the expert system 36. Included in the performance statistics of Table 1 is a window count which is the number of transmission intervals in a sampling group. The window max value is the maximum value set for the window 22. The RWI, CWI and CWRI count columns represent the congestion information. The PCI count column represents the queue held information. The PIU count column represents the number of packets which are transmitted. The byte count represents the total number of bytes over all of the packets in the sampling interval. The average PIU size column represents the average number of bytes per packet. The information in the performance statistics in the Table 1 corresponds to a particular node, for example node 1.

The expert system 36 in FIG. 10 includes the virtual route analyzer 38 and supporting programs which include a modeling program 68, a configuration manager 70 and a configuration data base 72.

Figure 12:
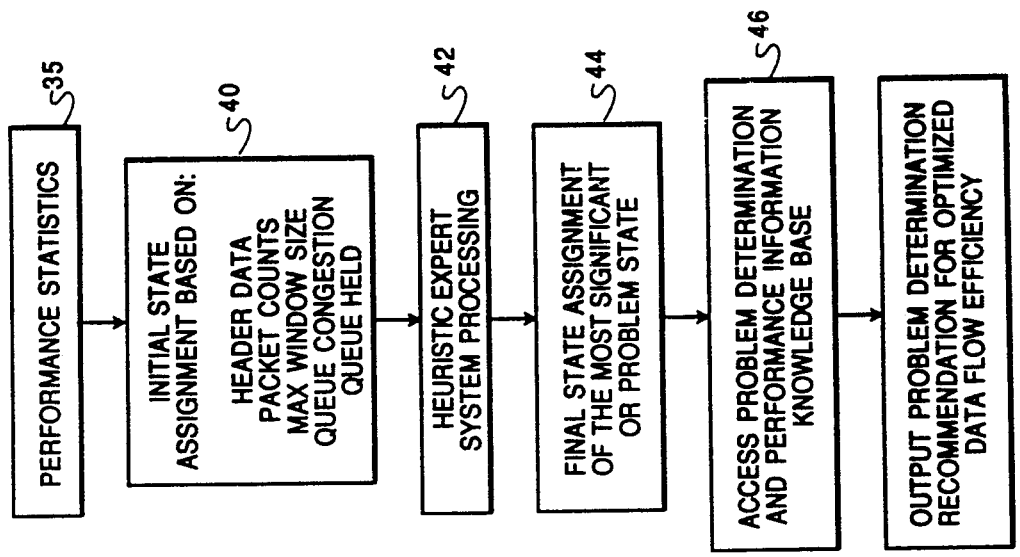
FIG. 12 is a high level flow diagram of the inventive method for determining the value of the data flow efficiency state variable S for the trace data from network under analysis and for obtaining a problem determination recommendation for optimized data flow efficiency for the network.

The virtual route analyzer 38 can be characterized by the high level flow diagram of FIG. 12. The performance statistics 35 are applied to a first stage 40 which performs the initial state assignment for a given sampling interval in Table 1, based upon header data, packet counts, a maximum window size, congestion information, and held states. After the initial state assignment in step 40, the flow diagram of FIG. 12 proceeds to step 42 where a heuristic process is carried out to apply empirically derived rules to the initial state assignment to modify the initial state assignment. After the heuristic processing in step 42, the flow diagram of FIG. 12 proceeds to step 44 where a final state assignment is made which assigns the most significant or problem state within the sampling interval. After the final state has been assigned in step 44, the flow diagram of FIG. 12 proceeds to step 46 wherein access is made to the knowledge base containing the problem determination recommendation and performance information necessary to improve the data flow for the data communication system.

Figure 13:
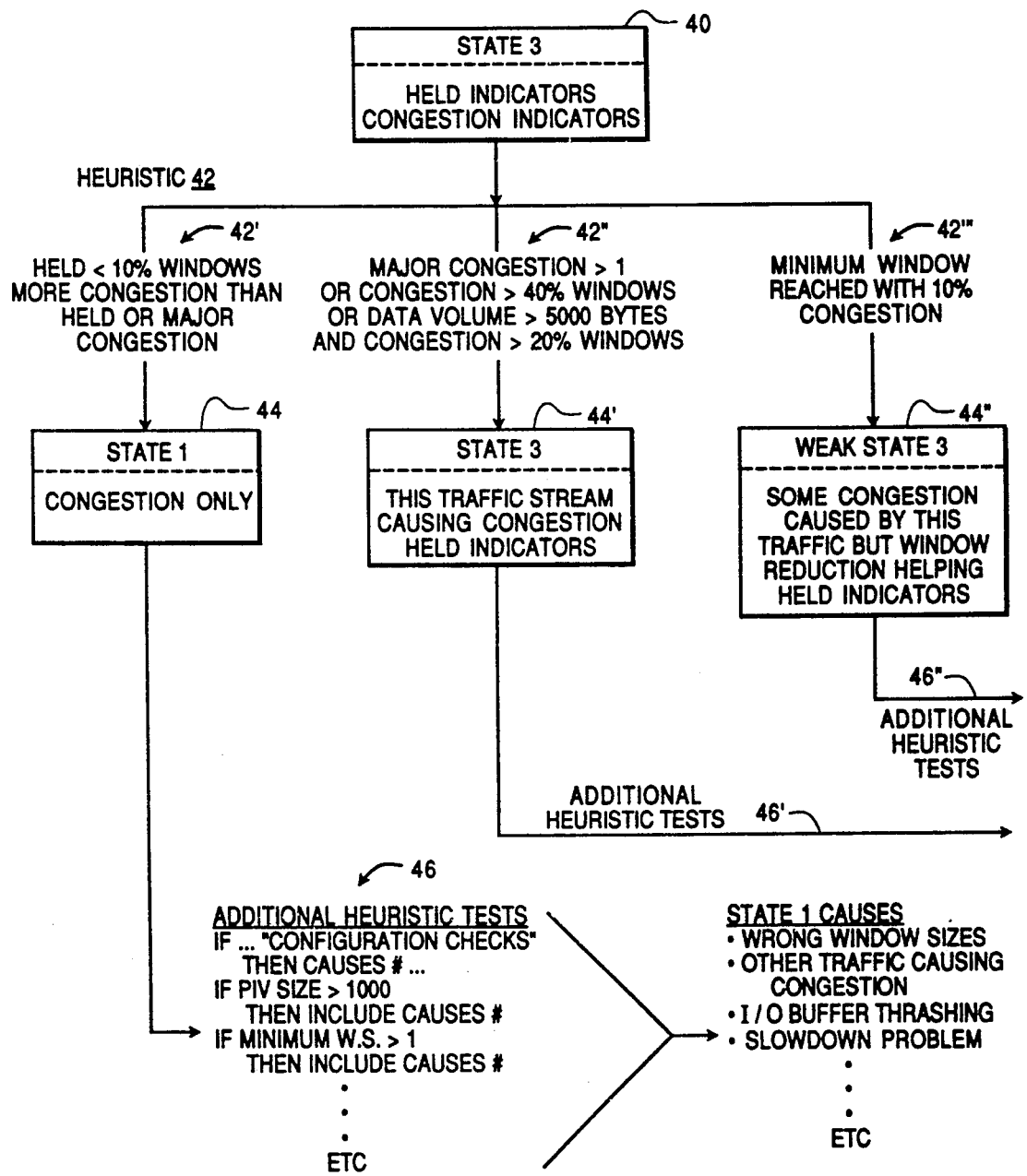
FIG. 13 illustrates a more detailed flow diagram of a first portion of FIG. 12.
Figure 14:
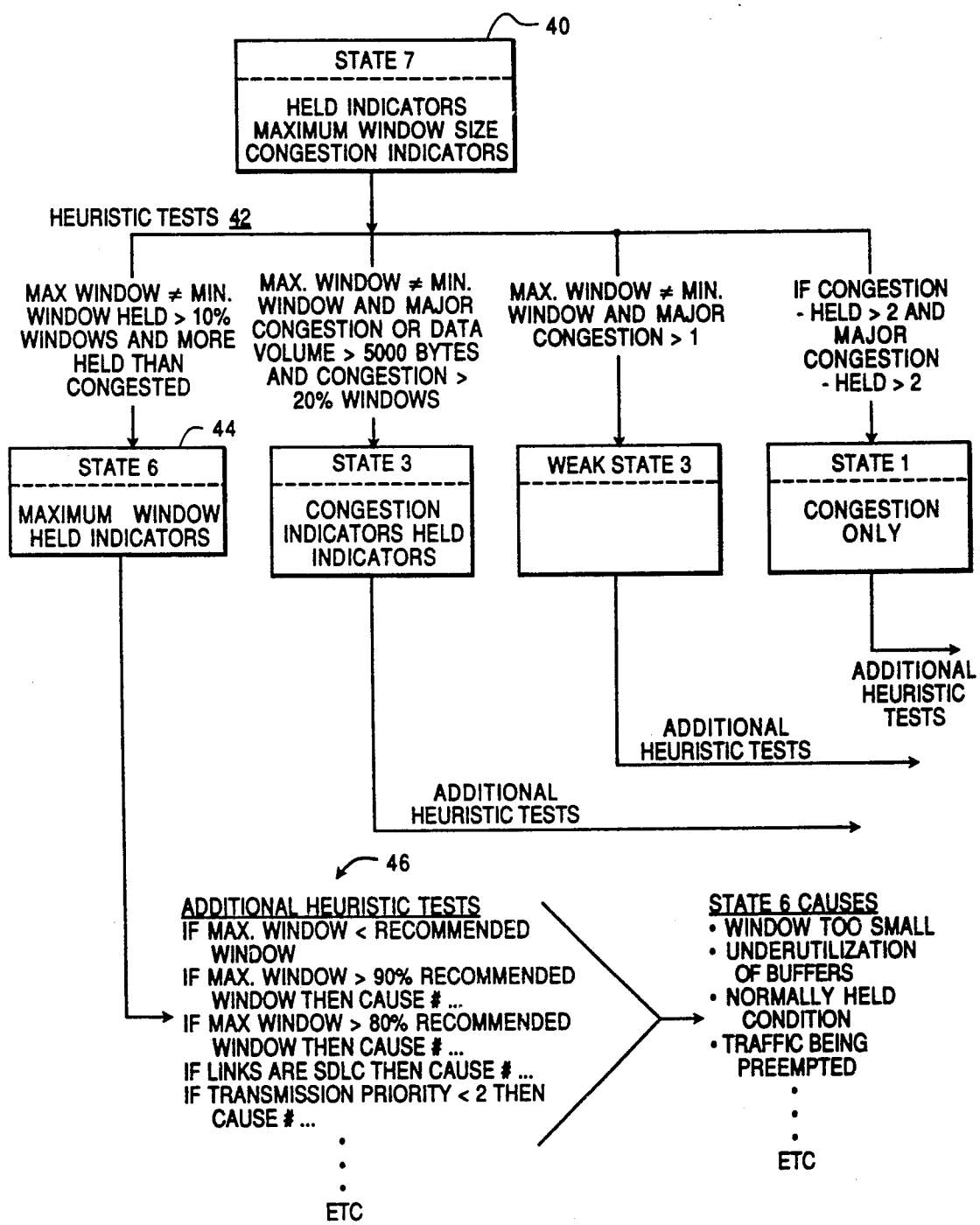
FIG. 14 illustrates a more detailed flow diagram of a second portion of FIG. 12.

FIGS. 13 and 14 provide two examples of the heuristic processing and final state attributions of steps 42 and 44 of FIG. 12. In FIG. 13, the step 40 has provided an initial state assignment of state 3 for the data flow efficiency state variable S. In FIG. 14, step 40 establishes the initial state 3 based on header data counts, maximum window size and congestion and held state information. An outline of the code to perform step 40 is given in Table 3. Then the heuristic tests 42 are conducted. In a first test 42', it is determined whether the number of held intervals is less than 10 percent. If it is, then it is determined whether there is more congestion than held intervals or if there is major congestion. If this is true, then state 3 is converted to state 1 where only congestion is considered to be important. An outline of the code to perform step 42 is given in Table 4. The flow diagram of FIG. 13 then flows to step 46 where the access is made to the problem determination and performance information knowledge base. For example, depending upon the type of node at which the trace information has been derived, the problem determination recommendation will be tailored. An outline of the code to perform step 46 in FIG. 13 is given in Table 6.

In the heuristic test 42, if there is not less than 10 percent held windows, then step 42" is tried where if major congestion is greater than 1, then the sequence illustrated in FIG. 13 is carried out to determine if state 3 is to remain as state 3, as shown in step 44'. If 42'' is not satisfied, then the heuristic test 42 transitions to step 42''' wherein minimum window is reached with 10 percent congestion. If this condition obtains, then the process flows to step 44''' and a weak state 3 is attributed to the interval. An outline of the code to perform step 46 in FIG. 13 is given in Table 6. In this manner, a problem determination recommendation is ultimately output by the knowledge base for application to the data communications system so as to optimize its performance (reference Table 8).

A second example of the operation of the invention is shown in FIG. 14. In the example of FIG. 14, state 7 is the initial state assignment for the sampling interval of Table 1. The heuristic test 42 shown in FIG. 14 is then tried and depending upon the satisfaction of a particular test, the final state is established in step 44 and the knowledge base is accessed in step 46 to obtain the problem determination recommendation optimizing the data flow efficiency at the network. An outline of the code to perform step 46 in FIG. 14 is given in Table 5. Table 7 shows a few probable causes that could be recommended.

An additional illustration of the performance statistics 35 is shown in Table 2 wherein a congestion situation is determined for a node under analysis in a data communications system.

The flow diagram of the inventive process in FIG. 12 is more fully described as follows. The performance statistics 35 can be represented by the data in Table 1 or alternately the data in Table 2. The performance statistics are supplied to step 40 to establish an initial state assignment. The initial state assignment is based on header data, packet counts, max window size, queue congestion, and queue held conditions for the node under examination in the network. Reference to Table 3 illustrates the component steps of step 40 in the process of FIG. 12. Step 40 begins by locating the interval containing the most congestion which is used for assigning state priorities. Then there is a determination of the maximum average packet size reported for any trace interval in the performance statistics. Then, determination is made as to the highest packet count reported in any interval trace in the performance statistics. Then, the maximum packet batch size is established. Thereafter, the binary bit B1 is determined to have a binary value of one if the maximum window was reached and an attempt was made to exceed the maximum window during his interval. Alternately, if congestion is occurring, B1 is set equal to one. Then, the binary value of B2 is set to one if a queue in the virtual route was ever held during this time period. Then, the binary value of B3 is set equal to one if any congestion indicators were received during this time interval. Also, the largest byte count is established for any packet during the interval in step 40.

In step 42 of the process of FIG. 12, the heuristic expert system processing takes place. Reference can be made to Table 4 for more detailed information on step 42. The initial state assignment established in step 40 is used in step 42 to select a portion of the code in step 42 which determines whether that initial state assignment should be modified. If the initial state assignment is zero, this is an optimal state and there is no problem to report. If the initial state assignment was a one, then the queue congestion bit is on and there is no change to be made to the initial state. If the initial state is two indicating that the queue held bit is on, there is no need to change that initial state.

However, if the initial state was determined in step 40 to be state 3, in which both the queue held bit is on and the queue congest bit is on, then Table 4 shows that an additional determination is made. If the interval was less than 10 percent held, then the initial state 3 can be converted to state 1 in which only the queue congest bit is on.

If the number of packets during the interval in which there was a queue held condition is less than 10 percent, this is considered a statistically insignificant condition and the state is redefined by the process as a state 1. The second step here is to validate state 3. In order to validate state 3, the process checks for three conditions. First, it checks that congestion is 40 percent of the window count. If it is not 40 percent of the window count under all circumstances, then we do not have a congestion problem. However, the process will lower that point percent threshold of the window count if the packet size is greater than 5000 bytes. If congestion is 10 percent of the window count, then the minimum window size did not successfully deal with the congestion. In other words, we slowed the network down, but we are still congested and we need to deal with the problem.

Still further in Table 4, if the initial state assignment was a four, this means that it was only a maximum window condition and this state value will not be modified.

In Table 4, if the initial state assignment was a state 5, then that means there was both a maximum window condition and a congestion problem. The process will not consider the congestion as part of state 5 unless there are in fact two indicators of congestion reported during the interval. If the initial state assignment was state 6, this indicates that both a maximum window condition and a queue held condition have been identified. This will not be reported by the process as a problem unless there are more than 10 percent of total windows which are held. Instead, the state 6 will be considered a state 4, i.e. merely a maximum window condition.

In state 7'S initial state assignment, all the bits are on. With a maximum window, the node is held and congested. The objective here is to find out if state 7 needs to be converted into a 3 or a 1 or a 4 or a 6. The process is trying to determine what is the most important thing that happened during the interval of data captured, because even though state 7 occurred, the held state may have only been on for a very short period of time and congestion may be the most significant problem. If that is true, then the process will report a state 3 and not report a state 7. The corresponding thing happens if the helds were significant and congestions were not.

State 7 can basically be changed to almost any other state, depending on the setting of the statistical indicators in Table 1 or Table 2. The tests that are being done by the process in state 7 determine whether or not the maximum window sizes are the same. If not, then the process checks to see if there are enough major congestion indicators to indicate that there is a big congestion problem during this period of time and therefore the process should at least report a state 3 to the user. If there are not enough major congestion indicators, then there are enough minor congestion indicators to indicate that a state 3 is still warranted, although not quite as severe as a major congestion problem, in which case the process may report a weak state 3. If the interval was at least 10 percent held without any congestion, in other words, there are very few congestion indicators, then a state 6 must have occurred inside the interval and therefore, the process makes state 6 true. Otherwise, if there were not any congestion indicators, then it is just simply a state 4.

At the end of Table 4, the following additional considerations are made. For example, if we have a state 4, then the process can decide that a state 4 is really not a problem if there are not enough held states. In other words, if the intervals are between 5 and 10 percent held, then the process can turn the state 4 off. In the data, it is possible for major congestion indicators to occur, but not to have congestion indicator bits being set. This is a function of the location where the trace is taking place. If the process determines that there are window size reductions for no apparent reason, then the process indicates that a blind WI occurred in the code. Blind WI means that major congestion occurred, but it is was explicitly detected in the trace mechanism. It can only be inferred from the way the window moves. The fact that a blind WI occurred indicates that we can locate where the congestion location is. The process will tell the user whether the congestion is at the trace point, or somewhere between the trace point and the destination or somewhere between the trace point and the origin's location.

Table 5 provides the steps which make up step 46 in FIG. 12, establishing the final state assignment of the most significant or problem state. Table 5 deals with the determination of the potential causes of state 6. If state 6 exists, the first thing the process will do is check to make sure that the user input a configuration that is possible to provide a state 6. The process looks at the trace data and the configuration input by the user to determine if it is compatible with the trace data. If not compatible, then the process will tell the user that there is an error somewhere and he has to adjust his description of the physical path.

If the configuration is okay, then the process will check for certain conditions to determine whether or not causes should be presented to the user. For example, if the maximum window size is less than the recommended maximum window size, and there is no NCP communications controller and there are no links, then the process will take specific action, depending on whether the maximum window size is greater than 90 percent of the recommended or 80 percent of the recommended maximum, in which case the process will identify a specific cause to be given to the user in that situation. However, if links exist and gateways exist along the path, then other causes can be presented to the user. If the transition priority of the traffic is less than transition priority 2, then the process can include again another cause indicating that the potential for the held state could be due to interfering traffic.

Table 6 illustrates additional component steps of step 46 of FIG. 12, where a determination is made of potential causes for state 1. Again, in this particular state, the process will check the configuration again to make sure the configuration is compatible with the actual data. If it is, then the process will check for configurations to determine whether it is just a host-to-host connection. If there is major congestion in that kind of connection, then the process will indicate a cause 2, which is an I/O buffer pool thrashing problem in a VTAM access method in a mainframe processor. Buffer thrashing means the buffer pools expand and contract and because of the extra activity, the data flow through the host is constrained, i.e. it slows down, causing performance problems. VTAM is virtual telecommunication access method, an IBM program product.

The next test is that if the destination is a host, then depending on the setting where the major congestion occurs, the process may not report cause 2. If there are real major congestion indicators and the destination is a host, then the process will report cause 2. If the destinations are a host, if it is an NCP or gateway, and there are major congestion indicators as well, then the process indicates that there is a physical unit causing excessive buffer usage. In other words, there is a device connected to the communications controller that's flooding its buffers. Otherwise if there are CWRIs which are minor congestion indicators, then the program indicates that aggregate data flows of a series of virtual routes are causing buffers and/or slow down problems in the communications controllers. CWRIs are change window reply indicators, i.e. they are congestion indicators.

If blind WRIs exist and there are real RWIs and there are minor congestion indicators and the configuration is an NCP attached to a host or a gateway attached to a host, then the NCP can't have a channel buffer problem. So the process will not report state 5. A blind RWI is a major congestion indicator that occurred in the data flow, but was not apparent because of the trace point. The process can infer its existence by watching the windows, as opposed to actually seeing it show up as a statistical count. Taking a look at everything that is going on in state 1, the process is determining a series of potential causes for this congestion state that are available to present to the user. The process is reordering the way the causes are presented to the user. In other words, the process will be checking for certain data flow and certain types of configurations and can eliminate the need to report some causes. In other words, there may be series of 10 probable causes to be in state 1. Yet when the process examines the configuration and data flow and maps the configuration to the data flow, only two of the causes are really possible. Then the question becomes, which cause do you want to present to the user. The process makes tests to determine which is the most significant cause and will present that to the user first. The process will do two things in this code, we eliminate causes based on the data flow and configuration and also order causes based on the most likely or the highest probability that an individual cause is causing the problem.

Table 7 illustrates component steps in step 46 of FIG. 12 which accesses the problem determination and performance information knowledge base. Table 7 deals specifically with causes for state 6 and shows a few of the potential causes that can be seen in state 6. For example, the first thing done in Table 7 is state 6, cause 0, which is a bad configuration. The process will let the user know that he has a problem with what he has defined. State 6, cause 1 is shown next. It says the maximum window size value is too small. This means that a logical constraint exists to data flow and the customer should deal with this by adjusting the parameter setting of the window sizes. The parameter setting of the window sizes will be printed out to the customer. State 6, cause 2 is shown next and it shows that there is a problem with data flow and you are not utilizing the buffers available. This problem can be resolved by again adjusting the window sizes. If there are enough buffers, in other words, the number of free buffers exceeds 50 percent of the storage capacity in the NCP or in the communications controller, there is no reason why the suggestions made by the process for different window size values cannot be implemented. State 6, cause 3 says that the route is normally held. It is not a problem, so if the window size is set properly, this is a normal way networks operate, depending on the configuration that was described. State 4 says that other traffic could be preempting this particular traffic at some transmission group queue on the path. There are more states and causes, but they are not shown here.

Table 8 gives a further illustration of step 46 in FIG. 12 and in particular addresses causes for state 1. Again, in Table 8, the process will check for a bad configuration. If a case zero shows up, that's a bad configuration. Otherwise, it is either cause 1, 2 or 3, etc. Cause 1 means that another data flow is merging with this data flow causing the congestion problem. Looking at this data flow is not going to solve the problem. The customer is recommended by the process to look at another data flow and the process gives them actions on how to accomplish that. State 1, cause 2 is a cause used by another state. State 1, cause 3 means the destination NCP has slowed down, the communications controller has run out of buffers, is severely impacted and has a storage constraint. The recommendation by the process is to either employ more storage or move some of the devices from the controller to another controller. State 1, cause 4 indicates the minimum window size is too large. That in turn is preventing the data flow from decreasing when congestion occurs and is forcing the congestion problem that is shown. There are additional causes for this state not shown in the table. The resulting expert system method invention provides an improved technique for analyzing the window protocol-based data flows in a data communications network. The improved method includes the steps of determining the value of the data flow efficiency state variable S from network statistics derived from a trace recorded for one or more nodes in a data communications network. Based upon the determination of the data flow efficiency state variable, a knowledge base is accessed which contains network problem determination recommendations and performance information which is output for use in optimizing the data flow efficiency at the network. The network can be tailored for peak efficiency with various types of data flow.

Although a specific embodiment of the invention has been disclosed, it will be understood by those having skill in the art that changes can be made to this specific embodiment without departing from the spirit and the scope of the invention.

TABLE 1

Performance Statistics
VIRTUAL ROUTE ANALYZER

DATE: 08/05/87  TRACE = DEMO  START: 07:57:30
INTRV: 00:10:00  VR = 00025 00005 00 1  STOP: 09:57:30

| WINDOW COUNT | WINDOW SIZE MAX | WINDOW SIZE MIN | WINDOW SIZE MEAN | RWI COUNT | CWI COUNT | CWRI COUNT | PCI COUNT | PIU COUNT | BYTE COUNT | AVG PIU SIZE |
|---|---|---|---|---|---|---|---|---|---|---|
| 241 | 6 | 6 | 6 | 0 | 0 | 0 | 1 | 1607 | 191442 | 129 |
| 360 | 6 | 6 | 6 | 0 | 0 | 0 | 5 | 2355 | 321216 | 146 |
| 328 | 6 | 6 | 6 | 0 | 0 | 0 | 3 | 2171 | 266151 | 132 |
| 294 | 6 | 6 | 6 | 0 | 0 | 0 | 5 | 1936 | 237487 | 132 |
| 401 | 6 | 1 | 5 | 12 | 0 | 0 | 14 | 2672 | 369224 | 154 |
| 245 | 6 | 1 | 5 | 5 | 0 | 0 | 5 | 1703 | 196184 | 133 |
| 298 | 6 | 6 | 6 | 0 | 0 | 0 | 3 | 1969 | 249380 | 136 |
| 267 | 6 | 6 | 6 | 0 | 0 | 0 | 1 | 1824 | 233518 | 141 |
| 365 | 6 | 1 | 5 | 3 | 0 | 0 | 5 | 2390 | 314726 | 147 |
| 396 | 6 | 6 | 6 | 0 | 0 | 0 | 9 | 2518 | 421338 | 175 |
| 348 | 6 | 6 | 6 | 0 | 0 | 0 | 7 | 2303 | 359270 | 169 |
| 392 | 6 | 2 | 5 | 1 | 0 | 0 | 8 | 2668 | 423025 | 178 |
| 322 | 6 | 6 | 6 | 0 | 0 | 0 | 4 | 2075 | 309190 | 158 |

TABLE 2

Performance Statistics
VIRTUAL ROUTE ANALYZER

DATE: 08/05/87  TRACE = DEMO  START: 07:57:30
INTRV: 00:10:00  VR = 00005 00025 00 1  STOP: 09:57:30

| WINDOW COUNT | WINDOW SIZE MAX | WINDOW SIZE MIN | WINDOW SIZE MEAN | RWI COUNT | CWI COUNT | CWRI COUNT | PCI COUNT | PIU COUNT | BYTE COUNT | AVG PIU SIZE |
|---|---|---|---|---|---|---|---|---|---|---|
| 158 | 5 | 5 | 5 | 0 | 0 | 0 | 0 | 1029 | 587649 | 737 |
| 199 | 6 | 4 | 5 | 0 | 0 | 2 | 2 | 1357 | 804145 | 796 |
| 199 | 5 | 5 | 5 | 0 | 0 | 0 | 0 | 1320 | 730916 | 728 |
| 176 | 5 | 4 | 4 | 0 | 0 | 1 | 1 | 1174 | 539112 | 603 |
| 340 | 6 | 4 | 4 | 0 | 0 | 4 | 140 | 2183 | 974084 | 541 |
| 293 | 6 | 3 | 4 | 0 | 0 | 7 | 143 | 1860 | 735457 | 451 |
| 181 | 6 | 5 | 5 | 0 | 0 | 0 | 2 | 1227 | 627380 | 666 |
| 218 | 6 | 5 | 5 | 0 | 0 | 2 | 74 | 1463 | 629395 | 520 |
| 313 | 6 | 5 | 5 | 0 | 0 | 3 | 147 | 2146 | 895609 | 497 |
| 138 | 6 | 6 | 6 | 0 | 0 | 0 | 0 | 1223 | 790078 | 942 |
| 220 | 6 | 5 | 5 | 0 | 0 | 2 | 76 | 1569 | 748063 | 605 |
| 348 | 6 | 3 | 4 | 0 | 0 | 13 | 156 | 2085 | 858581 | 501 |
| 146 | 6 | 5 | 5 | 0 | 0 | 0 | 1 | 1091 | 651143 | 834 |

Table 3

The following code implements step 40 for both examples in Fig 13 and Fig 14

```
'┌─────────────────────────┐
'│ Make state assignments  │
'└─────────────────────────┘
24
  erase state                            'Reset the state array.
  lrg.wmean=1
  lrg.byte!=none                         '"PIU" is a term for "packet"
  for x=one to last                      '"VR" means "virtual route"
    if wmean(x)>lr..................
    if cwri(x)>cwr.                      'Locate the interval containing the
      cwri....=....                      '  most congestion for use assigning
      cwri.max.....                      '  state priorities later on.
    if size(x)>....                      'Determine maximum average PIU size
      lr...........                      '  reported of any trace interval.
    if piu.........                      'Determine highest PIU count reported
      lrg....=.....                      '  in any interval traced.
    if (wma..........ch! then
      batch!=(wmax(!(x)                  'Establish maximum PIU batch size.
    end if
    if wm.....=max.                      'B1 is true if max window was reached
      if pci...>w.....                   '  and attempting to exceed the max
        a(x)=true                        '  during this interval
      elseif ......                      '  or if congestion is occurring when
        or cwr......                     '  at max window.
        a(x)=true
      end if
    end if
    if pci(x).......                     'B2 is true if VR was ever held during
      b(x)=true                          '  this time period.
    end if
    if ............                      'B3 is true if any congestion indicator
      or ..........                      '  were received during this time.
      or ..........
        c(x)=true
    end if
    if byte.cnt!(x)n ...=byte.cnt!(x)    'Largest byte count
    check.9=no
```

End of the step 40.

`********************************************************************`

Table 4

The following code implements step 42 for both examples in Fig 13 and Fig 14

```
*'┌──────────────────────────┐
 '│ Evaluate state of this VR│
 '└──────────────────────────┘
      select case (a()*-1)     'Assign state for time period.
        case 0                           '————————— STATE 0 —————————
          state(0)=tr....                'no problem to report
        case 1                           '————————— STATE 1 —————————
          state(1)=tr                    'congestion only
        case 2                           '————————— STATE 2 —————————
          state(2)=tr                    'only vr held
        case 3                           '————————— STATE 3 —————————
          if pci(x)<.                    'If this interval was less then
            if cwri(xthen                '10% held then convert the state 3
              state(1                    '  to a state 1
            else chec
            end if
          elseif rwi(                    'Otherwise, validate state 3.
            and wcnt(x
              state(3)=
              weak3=fal
```

```
        elseif rwi(
          or cwri(x)
          or piu.siz_
            and cwri
          or wmin(x)
            and cwri
            state(3)=
            weak3=fal
        else check.
        end if
      case 4
        state(4)=tr
      case 5
        state(5)=tr
        if rwi(x)>2
          or cwri(x
          then state(
      case 6
        if pcr=>10
          state(6)=
        else state(
        end if
      case 7
        state(7)=tr
        if max.ws<>
          if (pci(xrwi(
            or piu.s0 _
            and cwri
            state(3
          elseif cw
            if cwri
              or wm
              and c
              then stlse
          elseif no>1 _
            then stue
          end if
        end if
        if pci(x)=>
          and pci(x
          and 2!*(w)<pc
          then state(
          else state(
        if cwri(x)......state(1)=true
      case else
    end select
  next x
  if state(4) the
    if last.entry
      or periods.h
      then state(4)
  end if
  if not state(3)...blind.rwi>0 then
    state(1)=true
  end if
  if blind........
    location$="at
  elseif blind....
    location$="be....trace point."
  else location$=....and the DSA."
  end if
25
  num=zero: avg.p
  piu.f!=zero: pi
  size.f!=zero: s
  hp=....

End of the step 42.
```

'Otherwise, validate state 3
' Ignore less than 40% congested
' unless at least 5000 bytes per
'   window with 20% congestion
' or minimum window reached with
'   at least 10% congested.
' indicate true state 3
' and not weak state 3
'Else need to check for state 9

'——————— STATE 4 ———————
'max window only condition.
'——————— STATE 5 ———————
'max window and congestion.
' Ignore unless more than 2
' indications of congestion were
' reported during the interval.
'——————— STATE 6 ———————
'max window and vr held, report
' only if 10% total windows held.
'otherwise, window at max.

'——————— STATE 7 ———————
'max window, vr held & congestion.
'If max and min are not the same
'and enough RWIs exist to
' indicate congestion occurred
' when not at max in this time
' interval then report state 3.
'If there's enough CRWIs to
' offset the number of PCIs
' then this entry is a state 3
' candidate.

'If not state 3 yet, but RWIs
  ' exists, report weak state 3.

'If this interval was at least
' 10% held without congestion,
'then state 6 must have
' occurred inside the interval;
'else, indicate at max window.

'State 4 having less than 4
' intervals LT 5% or GT 10% held
' or less than 70% vr held then
' state 4 is not a problem.

'If only blind RWIs then congestion
' is an aggregate problem.
'Determine location of congestion
' relative to trace point.

'States of selected VR now identified.
'Reset variables used in
' calculations.

'Default Heuristic PIU size Adjustment

Table 5

The following code implements step 46 for example in Fig 14.

```
' ┌─────────────────────────────────────────┐
' │Determine potential causes of state 6    │
' └─────────────────────────────────────────┘
  if state(6) the                       'Assemble possible state 6 causes
    if bad.......                       'Report configuration incompatible
      cause.6$="0                       '  with trace data
    else cause.6$                       'else clear possible cause string
      if max.....                       'Max window less than rmax
        if ncps>n then.."2" else w$="1"
        if max...                       ' if max = or > 90% of rmax
          cause.6                       '   then show cause 5 then w
        elseif ma                       ' if max = or > 80% of rmax
          cause.6                       '   then show cause w then 5
        else caus                       ' else show cause w only.
        end if
      elseif link                       'Otherwise, if links exist
        if slow..                       ' if bottleneck not 1st TG or
          then ca                       '   gateway OSA, report cause 3
          if val(t.                     ' if VR has priority less than
            then ca                     '    2 include cause 4
          cause.6$=                     ' always include cause 5.
        else cause.                     'Always include cause 5.
        end if
      end if
    end if
  end if
```

End of the step 46 for figure 14.

************************************************************************

Table 6

The following code implements step 46 for example in Fig 13.

```
' ┌─────────────────────────────────────────┐
' │Determine potential causes of state 1    │
' └─────────────────────────────────────────┘
  if state(1) the                       'Assemble possible state 1 causes
    remove.1=no                         'Set remove cause 1 flag to no
    if bad.config                       'Report configuration incompatible
      cause.1$="0                       '  with trace data
    elseif config                       'If RWIs in a host to host config
      cause.1$="2                       '  then it must be cause 2
    else cause.1$                       'else clear possible cause string
      if dest$=..                       'If destination is a HOST
        if blind...config$="GH") then
          'Cannot ...problem'           ' do not report cause 2
        elseif rw                           'Real RWIs with HOST dest.
          cause.1
        end if
        elseif (des...i>1 then
          if cwri=.                         'BNN PU hardware causing
            cause.1                     '   excessive buffer usage
          elseif cw                         'VS aggrigate VR data flows
            cause.1                     '   are causing buffer and/or
          end if                        '   slowdown
        end if
        if bl...... or config$="GH") then
          'Cannot ....'                 ' do not report cause 5
          cause.1$=                     'Do include innocent bystander.
        elseif inst                     'Check for NCP subarea feeding
          or instr(c                    '  a channel to HOST subarea.
          if links=                     'Report a possible cause 5.
            cause.1
          else caus
```

```
            end if
        else cause.                            'Include innocent bystander.
        end if
        if min.ws>r                            'If large MIN window size and
         and (avg.p                            '   a large average PIU size
          or lrg.wm                            '   or never reached min window
         and val(mi                            '   with significant load on
          l=instr(3                            '   this VR then recommend the
          if val(mi... then                    '   minimum window value be
            cause.1                            '   decreased and eliminate
            remove.                            '   any reference to cause #1
          end if
        elseif min... "6") then
          cause.1$=                            'Recommend decrease min window and
          remove.1=                            '   remove any reference to cause #1
        end if
        if remove.1
          l=instr(c                            '   Remove any reference to cause #1
          if l=len(
            cause.1 ...1$)-1)
          elseif l>
            cause.1 ...len(cause.1$)-1)
          end if End of the step 46 for figure 13.

*************************************************************************

Table 7

The following code implements step 46 for example in Fig 14.

elseif state$="6" then              'Process cause for state 6.
    select case n$
      case "0"
        gosub bad.config                'State 6 cause number 0.
      case "1"                          'State 6 cause number 1.
print"
print"  CAUSE: The MAX window size is too small.                              "
print"  ACTION: Verify that the current MAX window size for this virtual     "
print"    route is                                                           ";
print"  RECOMMEND: MAX window size of this VR is currently less than the     "
print"    'Recommended MAX Window Size' of                                   ";
print"    increased to the RMAX value.  A MAX window size greater than       "
print"    the RMAX value is not recommended, nor is it necessary.  MIN       "
print"    window size should be set to 1.                                    ";
if ............................... then print str$(rmin);
end if
print"                                                                      1"
case "2"                            'State 6 cause number 2.
print"
print"  CAUSE: Under utilization of NCP buffers.  Applies because this       "
print"    VR consists exclusively of channel TGs.                            "
print"  ACTION: Review the NCP's buffer utilization under heavy load         "
print"    using NPM.                                                         "
print"  RECOMMEND: If the number of free buffers exceeds 50% then it is      "
print"    recommended to increase the MAX window size parameter to           ";
print str$(rmax);"."
print"|   The minimum window size should be set to 1.                       |";
if rmin............................then
print str$(rmin);   print " because of GATEWAY."
end if
print"                                                                      2"
case "3"                            'State 6 cause number 3.
print"
print"  CAUSE: A normally HELD VR condition exists.                          "
print"  ACTION: Use NPM to determine utilization of the lowest capacity      "
print"    (bottleneck) TG in the VR path.  If it is highly utilized, the     "
print"    HELD VR condition is normal.                                       "
print"  RECOMMEND: The HELD VR condition is not in itself a problem.         "
print"    If performance on this virtual route is a concern, increasing      "
print"    the capacity of the bottleneck TG may help.                        ";
```

```
if ....................then
print"The current MAX"
print"|   window size of                                                    |";
print str$(max.ws);
if ..............then print " should"; else print " can";
print " be lowered to the RMAX value of";
print str$(rmax);".";
end if
print"└─────────────────────────────────────────────────────────────────────┘3"
case "4"                              'State 6 cause number 4.
print"┌─────────────────────────────────────────────────────────────────────┐"
print"|CAUSE: This VR traffic is being preempted at a TG priority queue     |"
print"|   by PIUs from a higher priority virtual route.                     |"
print"|ACTION: Determine if the physical resources used by this VR are      |"
```

End of the step 46 for figure 14.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Table 8

The following code implements step 46 for example in Fig 13.

```
    elseif state$="1" then             'Process cause for state 1.
    select case n$
       case "0"
          gosub bad.config             'State 1 cause number 0.
       case "1"                        'State 1 cause number 1.
          y=y+1
print"┌─────────────────────────────────────────────────────────────────────┐"
print"|CAUSE: Other VRs may be merging at points within the network         |"
print"|   causing the congestion, but this VR did not have sufficient       |"
print"|   load during some intervals to be the only source of problem.      |"
print"|ACTION: Find routes contributing to congestion by applying the       |"
print"|   VR intersect technique                                            |";
print location$
print"|RECOMMEND: If intersecting VRs are in the problem list, select       |"
print"|   them for analysis, else run trace from another node in path.      |"
print"|   Also, ensure recommended window sizes for this VR are used.       |"
print"└─────────────────────────────────────────────────────────────────────┘1"
       case "2"                        'State 1 cause number 2.
          gosub cause.2
       case "3"                        'State 1 cause number 3.
print"┌─────────────────────────────────────────────────────────────────────┐"
print"|CAUSE: The destination NCP was in slowdown.                          |"
print"|ACTION: Check the system console log for a slowdown message.         |"
print"|RECOMMEND: Slowdown at the boundary node may be resulting from a     |"
print"|   hardware problem in either the BNN or the devices attached.  A    |"
print"|   user task may be causing the NCP to loop.  An over configured     |"
print"|   BNN resource can also have this impact. If necessary, increase    |"
print"|   the controller storage or transfer some LU's to another BNN.      |"
print"└─────────────────────────────────────────────────────────────────────┘3"
       case "4"                        'State 1 cause number 4.
print"┌─────────────────────────────────────────────────────────────────────┐"
print"|CAUSE: A large MIN window size is preventing this virtual route      |"
print"|   from decreasing its load into the congested network.              |"
print"|ACTION: Verify the current MIN window size for this VR is            |";
print str$(min.ws);"."
print"|RECOMMEND: The MIN window size should be lowered to a value of       |"
print"|                                                                     |";
print str$(rmin);".  ";
print "This is required to permit VR flow control to adjust the"
print"|   window when necessary to alleviate congestion in the network.     |"
```

End of the step 46 for figure 13.

What is claimed is:

1. An expert system method for analysing the window protocol-based data flow in a data communications network over which data packets are transmitted, said data packets including a data portion and a header portion, comprising:

setting a packet transmission window to have a maximum quantity of N packets which can be transmitted within an interval from a node in the network;

setting a queued packet threshold value to a quantity of C packets which may be held in a queue during an interval at the node;

defining a data flow efficiency state variable S as a binary number having at least three bits, with a first bit B1;

counting the number of packets transmitted from the node during a measurement interval and setting B1 if the number of packets transmitted is equal to N;

setting B2 if any packet is held in the queue during the measurement interval;

setting B3 if more than C packets are held in the queue during the measurement interval;

determining the value of said data flow efficiency state variable S from values of B1, B2 and B3 set by said counting and setting steps;

accessing a knowledge base containing network problem determination recommendations which are accessible with said value of said data flow efficiency state variable S;

outputting a problem determination recommendation for optimizing data flow efficiency in said network in response to accessing said knowledge base with said value of S.

2. The method of claim 1, wherein the step of determining the value of the data flow efficiency state variable S further comprises the steps of:

establishing an initial state assignment for a measurement interval; and comparing the number of congested intervals to the total number of held intervals.

3. The method of claim 1, wherein the step of determining the value of the data flow efficiency state variable S further comprises the step of:

determining whether the byte count during the measurement interval exceeds a predetermined value.

4. The method of claim 1, wherein the step of determining the value of the data flow efficiency stat variable S further comprises the step of:

determining whether the number of held intervals exceeds a predetermined percentage of total transmission intervals.

5. The method of claim 1, wherein the step of determining the value of the data flow efficiency state variable S further comprises the step of:

determining whether the number of congested intervals exceeds a predetermined percentage of the total number of transmission intervals in the measurement interval.

6. The method of claim 1, wherein the step of determining the value of the data flow efficiency state variable S further comprises the steps of:

providing a second queue threshold value which is greater than said first threshold value; and determining whether said second threshold value is exceeded for any transmission interval in said measurement interval.

7. The method of claim 1 wherein said step of accessing a knowledge base containing network problem determination recommendations further comprising the steps of:

evaluating the most significant value of the data flow efficiency state variable; and combining said most significant state value with path configuration information for said node.

8. An expert system method for analyzing the window protocol-based data flow in a data communications network over which data packets are transmitted, said data packets including a data portion and a header portion, comprising:

setting a packet transmission window to have a maximum quantity of N packets which can be transmitted within an interval from a terminal in the network;

setting a queued packet threshold value to a quantity of C packets which may be held in a queue during an interval at the terminal;

defining a data flow efficiency state variable S as a binary number having at least three bits, with a first bit B1, a second bit B2 and a third bit B3;

receiving at the terminal during a first interval, a plurality of M1 packets which is less than N packets from a source input;

transmitting from the terminal during a second interval said M1 packets over said network to a destination;

receiving at the terminal during said second interval, a plurality of M2 packets which is more than N packets from said source input;

transmitting from said terminal during a third interval, N of said M1 packets over said network to said destination and queuing M2-N packets at said terminal;

marking during said third interval an N+1st packet of said queued packets as being held in said queue;

marking during said third interval said N+1st packet of the queued packets as being congested in said queue if there are more than C packets in said queue;

counting the number of packets transmitted from the terminal during a measurement period including a plurality of intervals and setting B1 if the number of packets transmitted during an interval is equal to N;

setting B2 if any packet is held in the queue during the measurement period;

setting B3 if more than C packets are held in the queue during any interval in the measurement period;

determining the value of said data flow efficiency state variable S from values of B1, B2 and B3 set by said counting and setting steps;

accessing a knowledge base containing network problem determination recommendations which are accessible with said value of said data flow efficiency state variable S;

outputting a problem determination recommendation for optimizing data flow efficiency in said network in response to accessing said knowledge base with said value of S.

9. The method of claim 8, wherein the step of determining the value of the data flow efficiency state variable S further comprises the steps of:

establishing an initial state assignment for a measurement period; and comparing the number of congested intervals to the total number of held intervals.

10. The method of claim 8, wherein the step of determining the value of the data flow efficiency state variable S further comprises the step of:

determining whether the byte count during the measurement period exceeds a predetermined value.

11. The method of claim 8, wherein the step of determining the value of the data flow efficiency state variable S further comprises the step of:
   determining whether the number of held intervals exceeds a predetermined percentage of total intervals.

12. The method of claim 8, wherein the step of determining the value of the data flow efficiency state variable S further comprises the step of:
   determining whether the number of congested intervals exceeds a predetermined percentage of the total number of intervals in the measurement interval.

13. The method of claim 8, wherein the step of determining the value of the data flow efficiency state variable S further comprises the steps of:
   providing a second queue threshold value which is greater than said first said threshold value; and
   determining whether said second threshold value is exceeded for any transmission interval in said measurement interval.

14. The method of claim 8, wherein said step of accessing a knowledge base containing network problem determination recommendations further comprising the steps of:
   evaluating the most significant value of the data flow efficiency state variable; and
   combining said most significant state value with configuration information for said terminal.

15. An expert system method for analysing the window protocol-based data flows in a data communications network over which plural data packets are transmitted during a transmission, said analyzing being performed over a measurement interval including a plurality of said transmission intervals, said data packets including a data portion and a header portion, comprising:
   setting a packet transmission window to have a maximum quantity of N packets which can be transmitted within a transmission interval from a node in the network;
   setting a queued packet threshold value to a quantity of C packets which may be held in a queue during a transmission interval at the node;
   defining a data flow efficiency state variable S as a binary number having at least three bits, with a first bit B1, a second bit B2 and a third bit B3;
   counting the number of packets transmitted from the node during a measurement interval as a packet count and setting B1 if the number of packets transmitted in any transmission interval is equal to N;
   setting B2 if any packet is held in the queue during the measurement interval;
   setting B3 if more than C packets are held in the queue during any transmission interval in the measurement interval;
   determining an initial value of said data flow efficiency state variable S from values of B1, B2 and B3 set by said counting and setting steps;
   selectively modifying said value of said data flow efficiency state variable S to a modified value based on said packet count;
   accessing a knowledge base containing network problem determination recommendations which are accessible with said modified value of said data flow efficiency state variable S;
   outputting a problem determination recommendation for optimizing data flow efficiency in said network in response to accessing said knowledge base with said modified value of S.

16. The method of claim 15, wherein the step of determining the value of the data flow efficiency state variable S further comprises the step of:
   comparing the number of congested intervals to the total number of held intervals.

17. The method of claim 15, wherein the step of determining the value of the data flow efficiency state variable S further comprises the step of:
   determining whether the byte count during the measurement interval exceeds a predetermined value.

18. The method of claim 15, wherein the step of determining the value of the data flow efficiency state variable S further comprises the step of:
   determining whether the number of held intervals exceeds a predetermined percentage of total transmission intervals.

19. The method of claim 15, wherein the step of determining the value of the data flow efficiency state variable S further comprises the step of:
   determining whether the number of congested intervals exceeds a predetermined percentage of the total number of transmission intervals in the measurement interval.

20. The method of claim 15, wherein the step of determining the value of the data flow efficiency state variable S further comprises the steps of:
   providing a second queue threshold value which is greater than said first said threshold value; and
   determining whether said second threshold value is exceeded for any transmission interval in said measurement interval.

21. The method of claim 15, wherein said step of accessing a knowledge base containing network problem determination recommendations further comprising the steps of:
   evaluating the most significant value of the data flow efficiency state variable; and
   combining said most significant state value with configuration information for said node.

* * * * *